United States Patent [19]
Rojas

[11] Patent Number: 5,441,330
[45] Date of Patent: Aug. 15, 1995

[54] BACK SUPPORT FOR MOTORCYCLES

[76] Inventor: Libardo Rojas, 50 Lake Ave., Blasdell, N.Y. 14219

[21] Appl. No.: 797,202

[22] Filed: Nov. 25, 1991

[51] Int. Cl.$^6$ .............................................. B60N 2/02
[52] U.S. Cl. ........................... 297/383; 297/DIG. 9; 297/188.05; 297/195.12; 297/230.1; 297/352; 297/383
[58] Field of Search .................. 297/383, 284.3, 284.5, 297/284.8, 112, 114, 188, 195, 230, 352, DIG. 9

[56] References Cited

U.S. PATENT DOCUMENTS

| | | | |
|---|---|---|---|
| 1,033,156 | 7/1912 | Conboy | 297/DIG. 9 X |
| 3,822,917 | 7/1974 | George | 297/DIG. 9 X |
| 3,901,534 | 8/1975 | Popken | 297/DIG. 9 X |
| 4,032,189 | 6/1977 | Benavente et al. | 297/DIG. 9 X |
| 4,673,190 | 6/1987 | Ahlberg | 297/DIG. 9 X |
| 5,026,119 | 6/1991 | Frank et al. | 297/DIG. 9 X |

*Primary Examiner*—Laurie K. Cranmer

[57] ABSTRACT

The back support for motorcycles was designed for use on any type of motorcycle on the market and, it will consist of two basic parts.

The first part, called the base or main support, which can be made up of a single piece of steel or it could be 2 straight single steel bars, those of which will be attached to the right and left of the posterior motorcycle frame. Those sections will have, at the middle area over the right and left sides, an open track in order to receive the 2nd part.

The second part, called the sliding support bar, this one will have a movable right and left bar in order to move back and forth over the open track of the first part that will facilitate for the sliding support bar to be put in many different positions when desired which will provide to the driver or the passenger with a simple, easy, and secure back support and, with the help of a cushion pad which will be located on the upper area of those bars of this second part and, by the action of a free rotation movement of the cushion pad, it may be used as a luggage rack when the necessity requires.

5 Claims, 11 Drawing Sheets

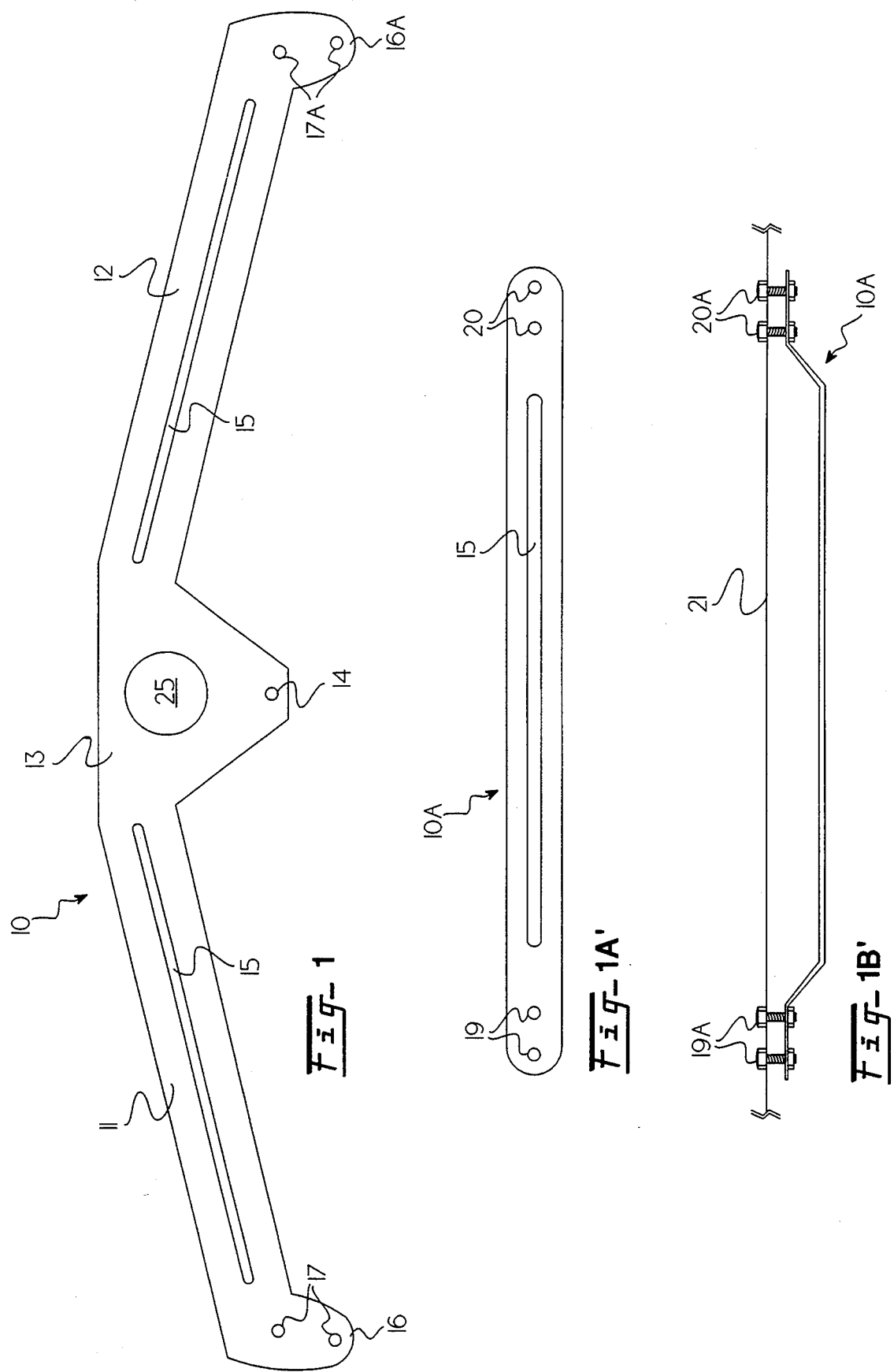

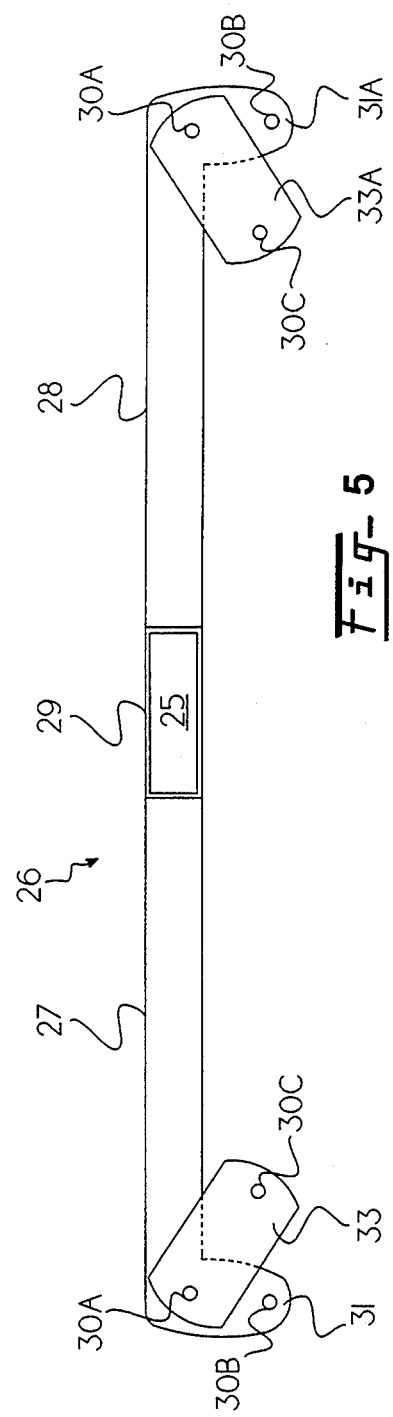
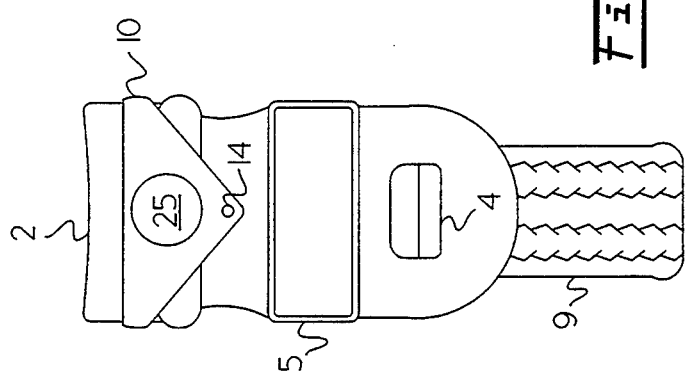

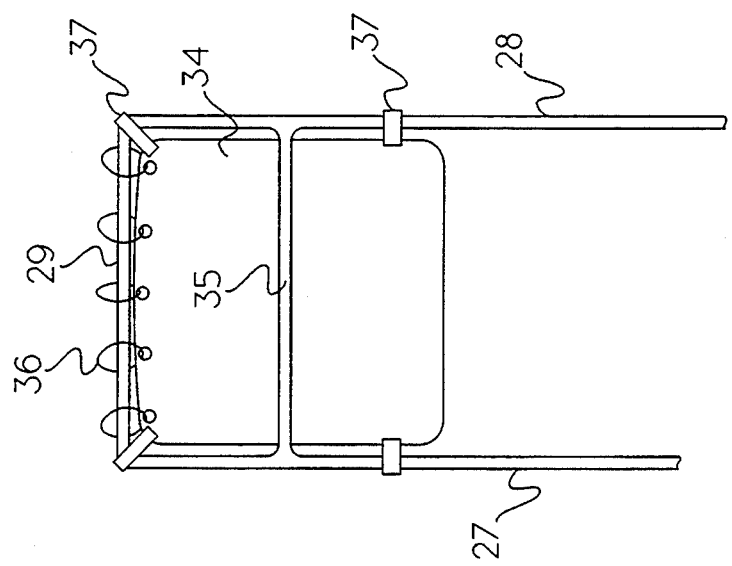
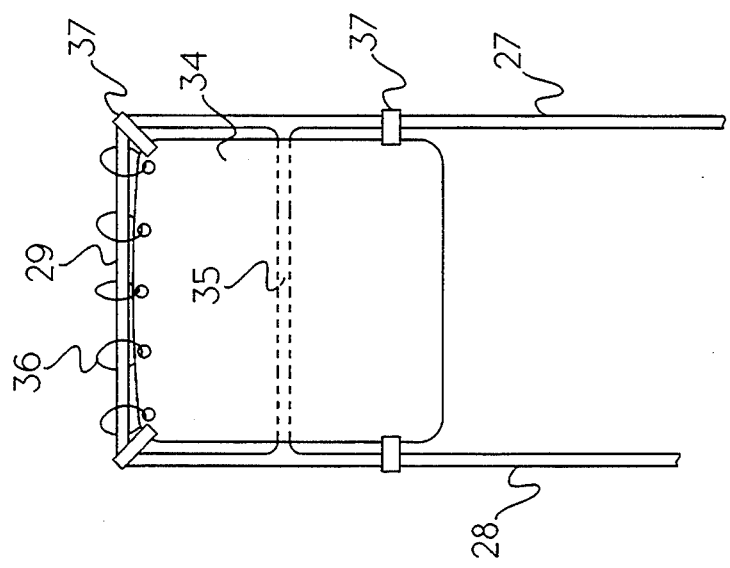
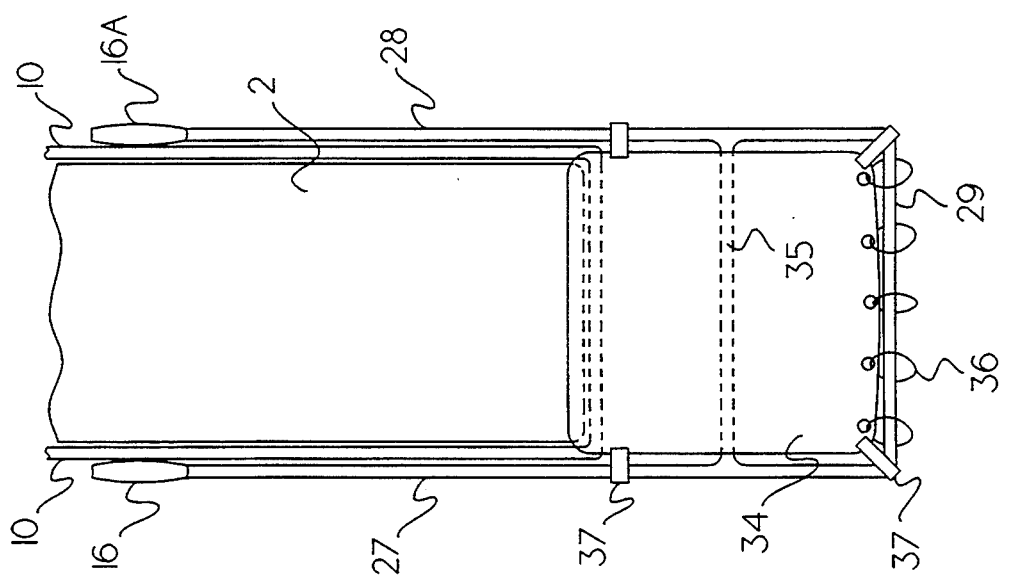

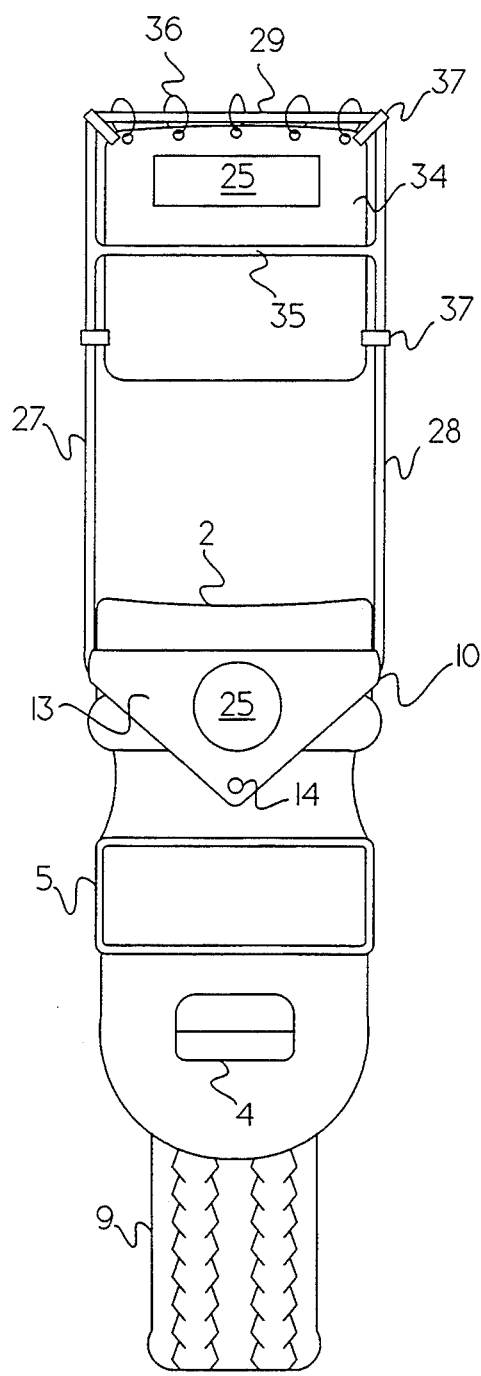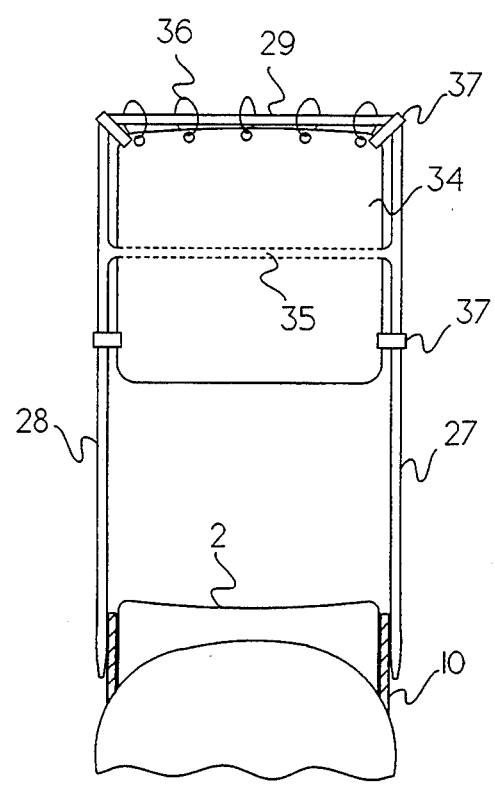
Fig-7
Fig-7A

BACK SUPPORT FOR MOTORCYCLES

BACKGROUND OF THE INVENTION

1) Field of the Invention

Multiple uses of back support for motorcycles.

2) Description of the Prior Art

In the past, back support for motorcycle riders were intended for the passenger. Then a few years later, it was combined by using it as a luggage rack also. Some of these inventions of back support were modified to be used by the driver and the passenger. The combination of all these 3 positions have had some operational deficiencies of prior art in the motorcycle back rest which are solved with this invention.

SUMMARY OF THE INVENTION

In order to have an easy, pleasant, and safe drive on a motorcycle, I have designed a simple and practical back support that can be used by the driver, the passenger, or may be used as a luggage rack.

The Multiple uses of the back support will be used only when the driver or the passenger desires to have a back support, especially while on long, tiresome trips.

The Multiple uses of the back support will be helpful, practical, adjustable, and very easy to mount to mostly any type of motorcycle on the market.

BRIEF DESCRIPTION OF THE DRAWINGS

FIG. #1A is a view of the rear of a motorcycle showing the 2 principle elements of it: 1) the main base of support plate and 2) the sliding support bar which together forms the back support to the passenger and, the phantom lines show the support to the driver.

FIG. #1 is a complete, isolated, continued view of a steel piece bar which represents the first component of the invention called the main base of support plate.

Figure 1A:
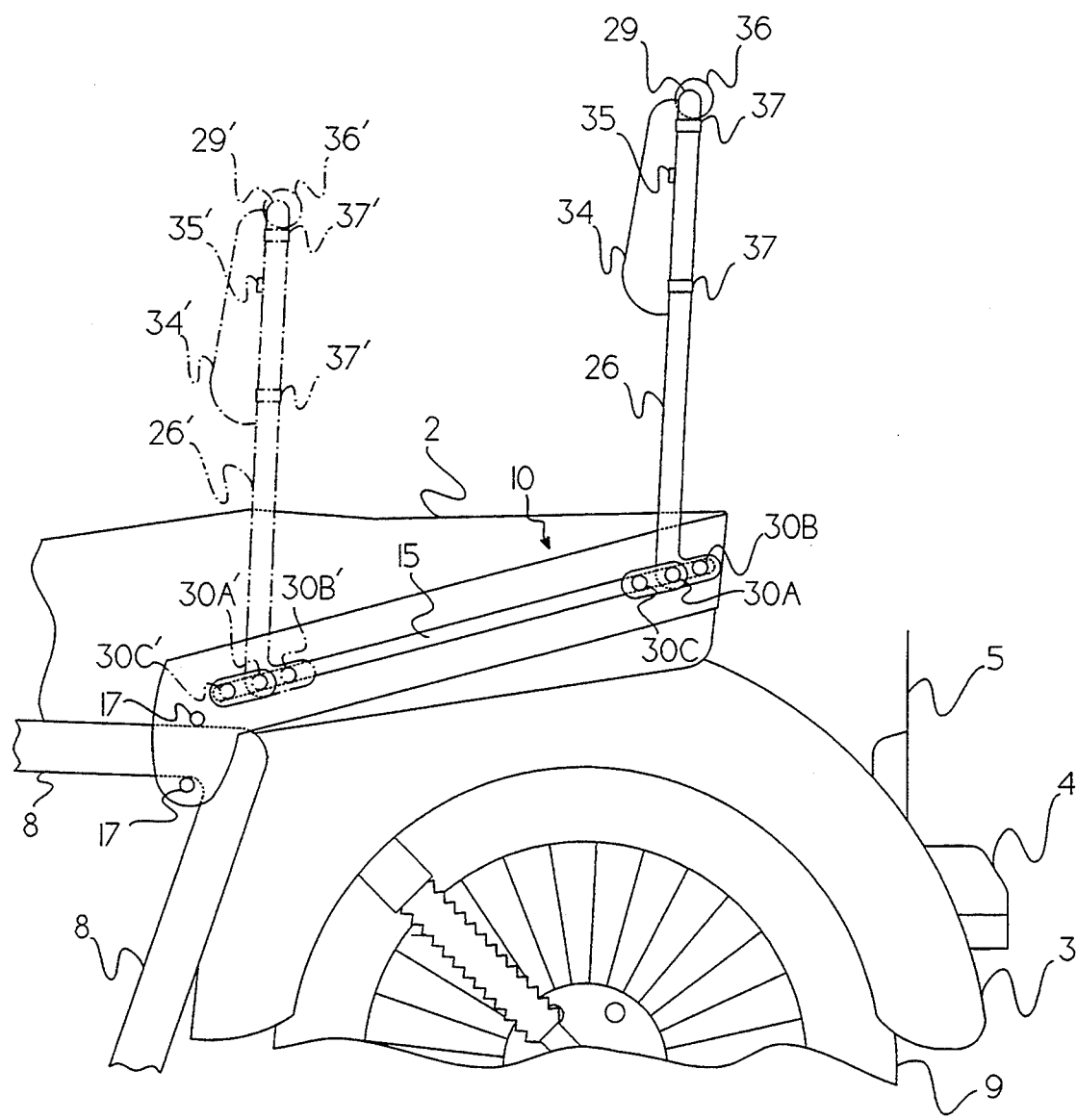
Figure 1C:
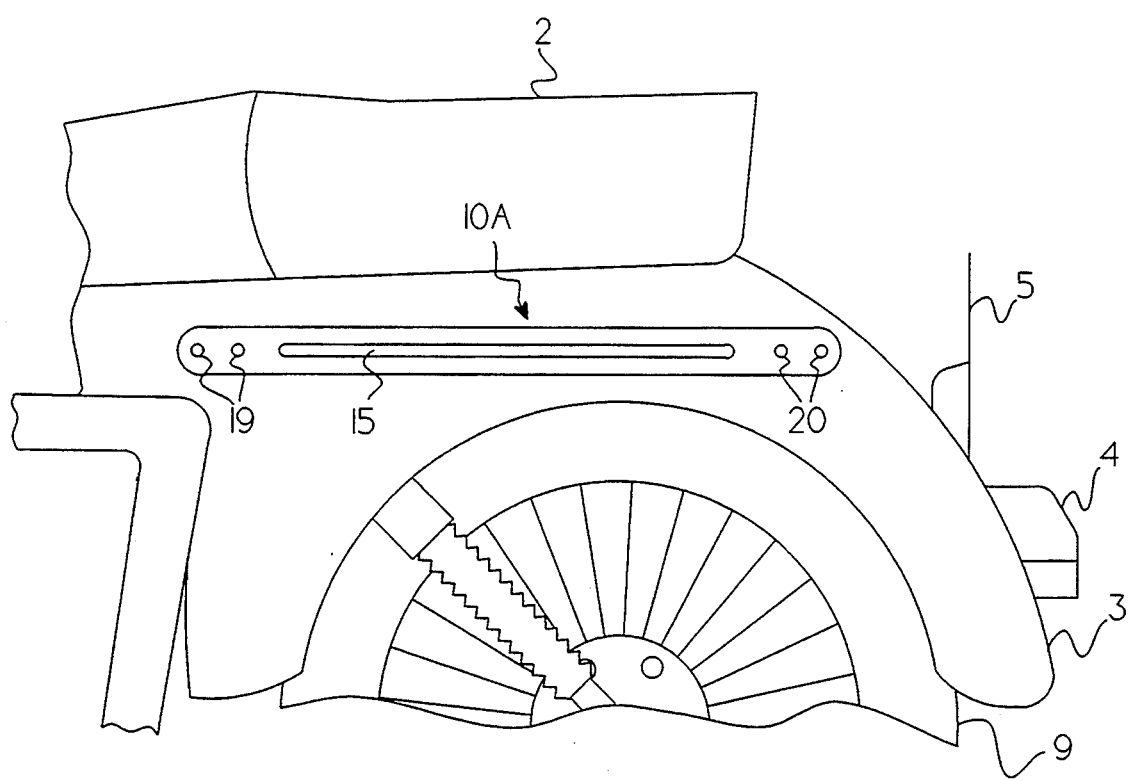
Figure 2:
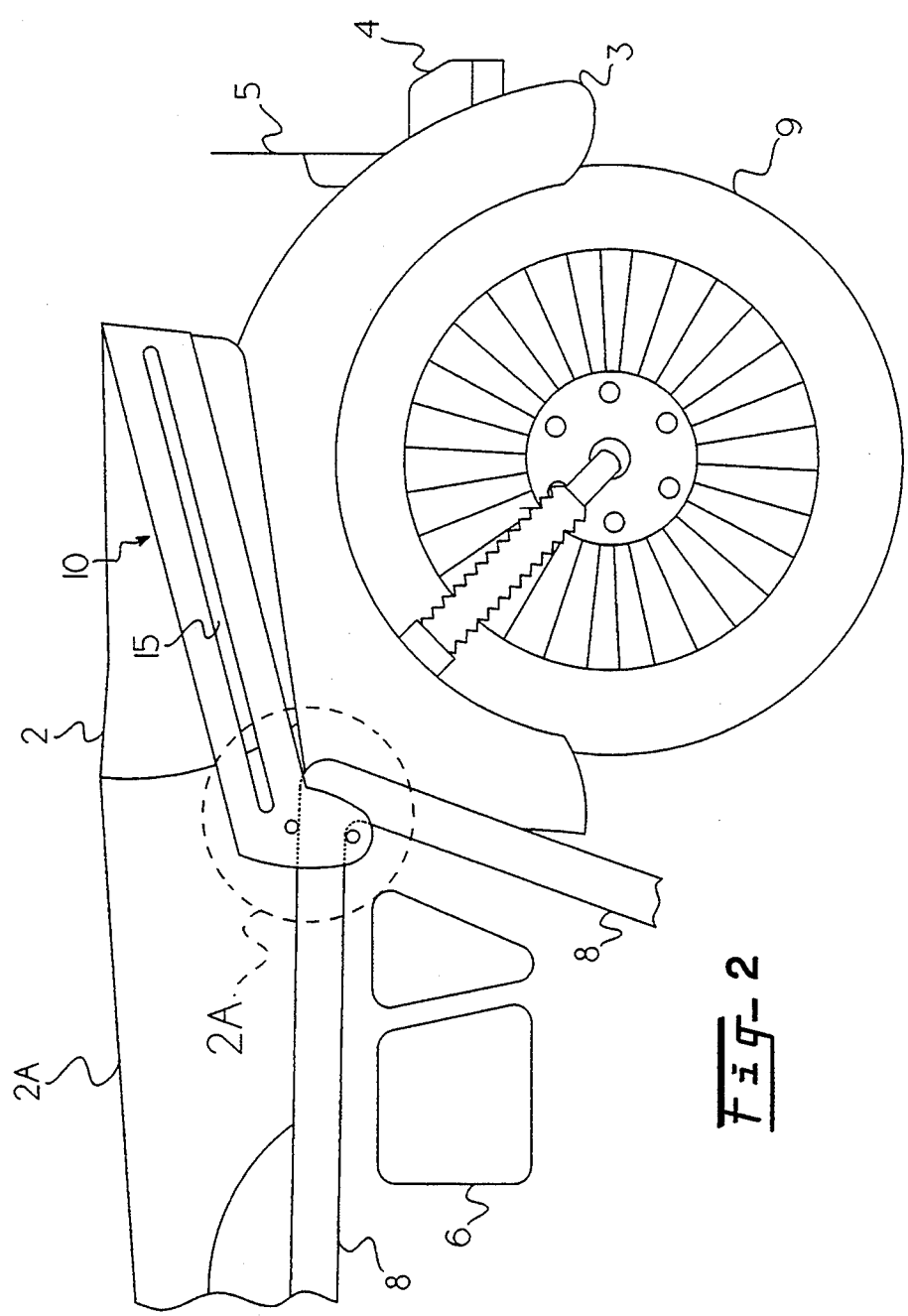
Figure 2A:
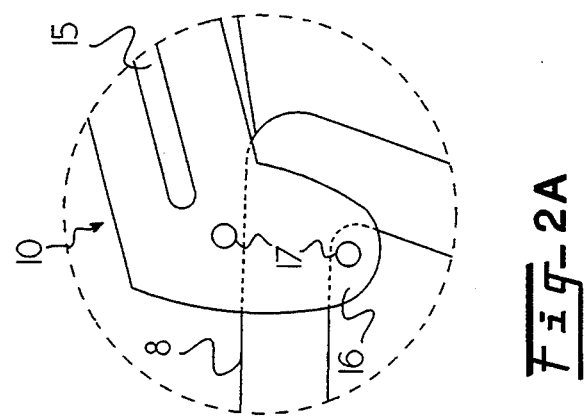
Figure 3A:
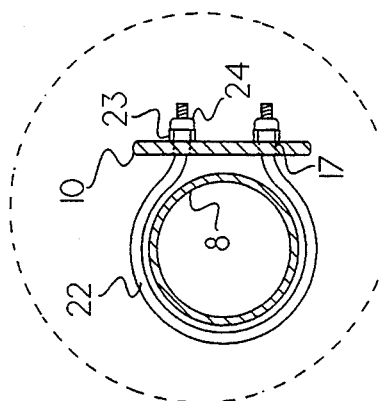
Figure 3:
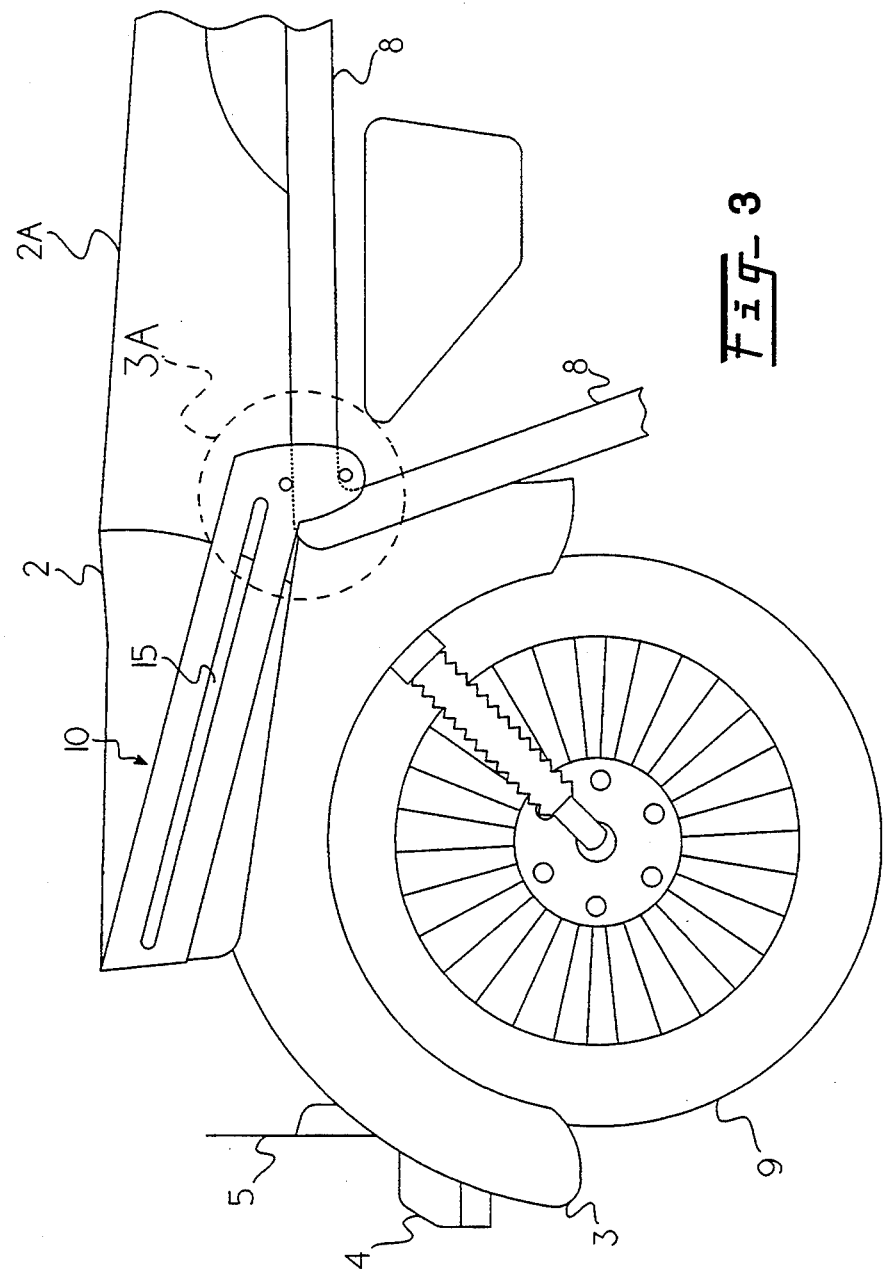
Figure 8:
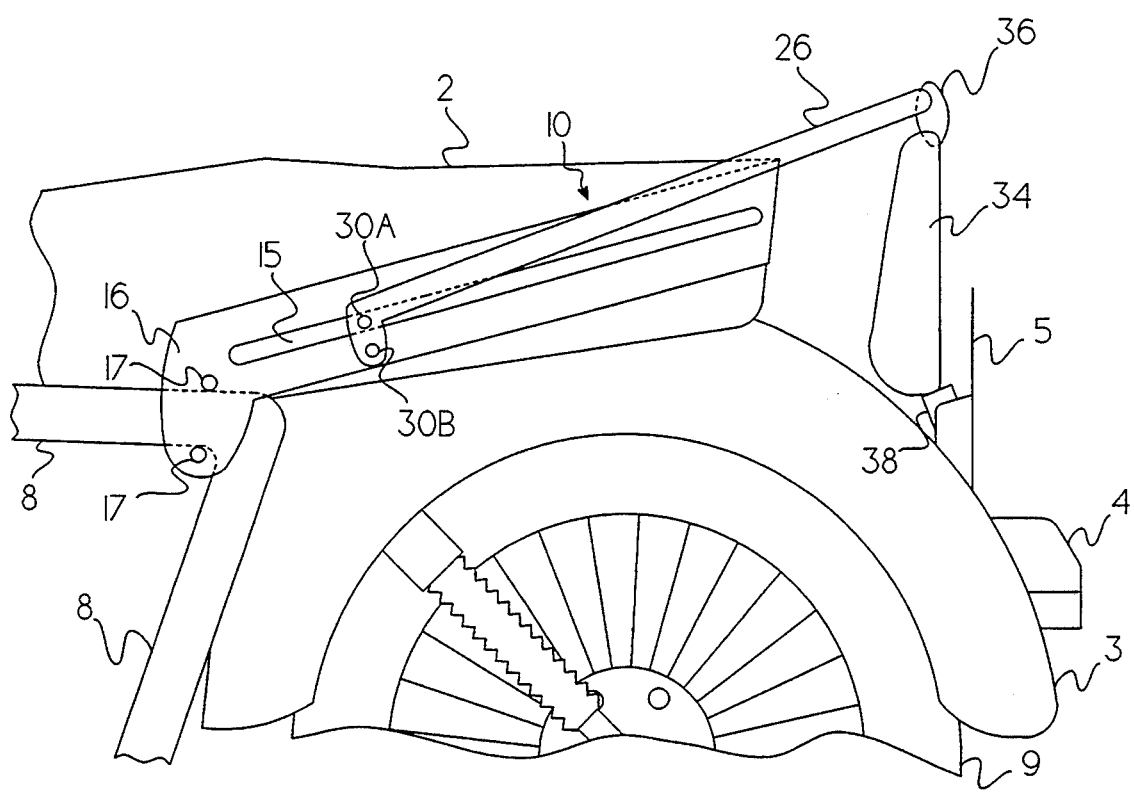
Figure 9:
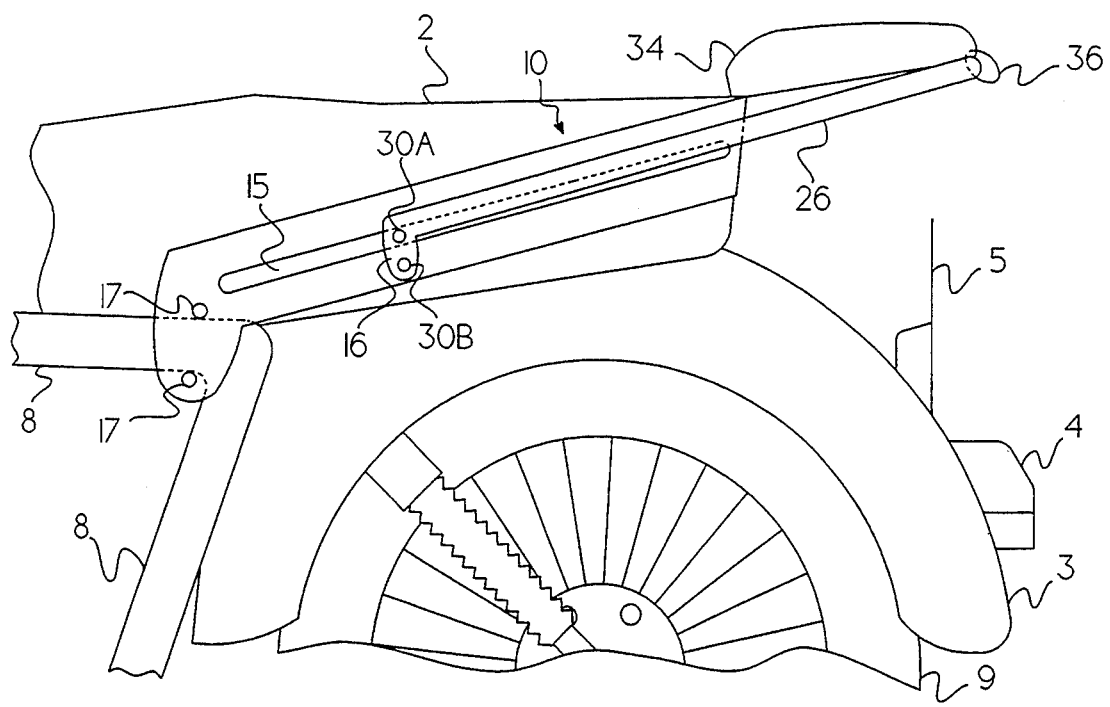
Figure 10:
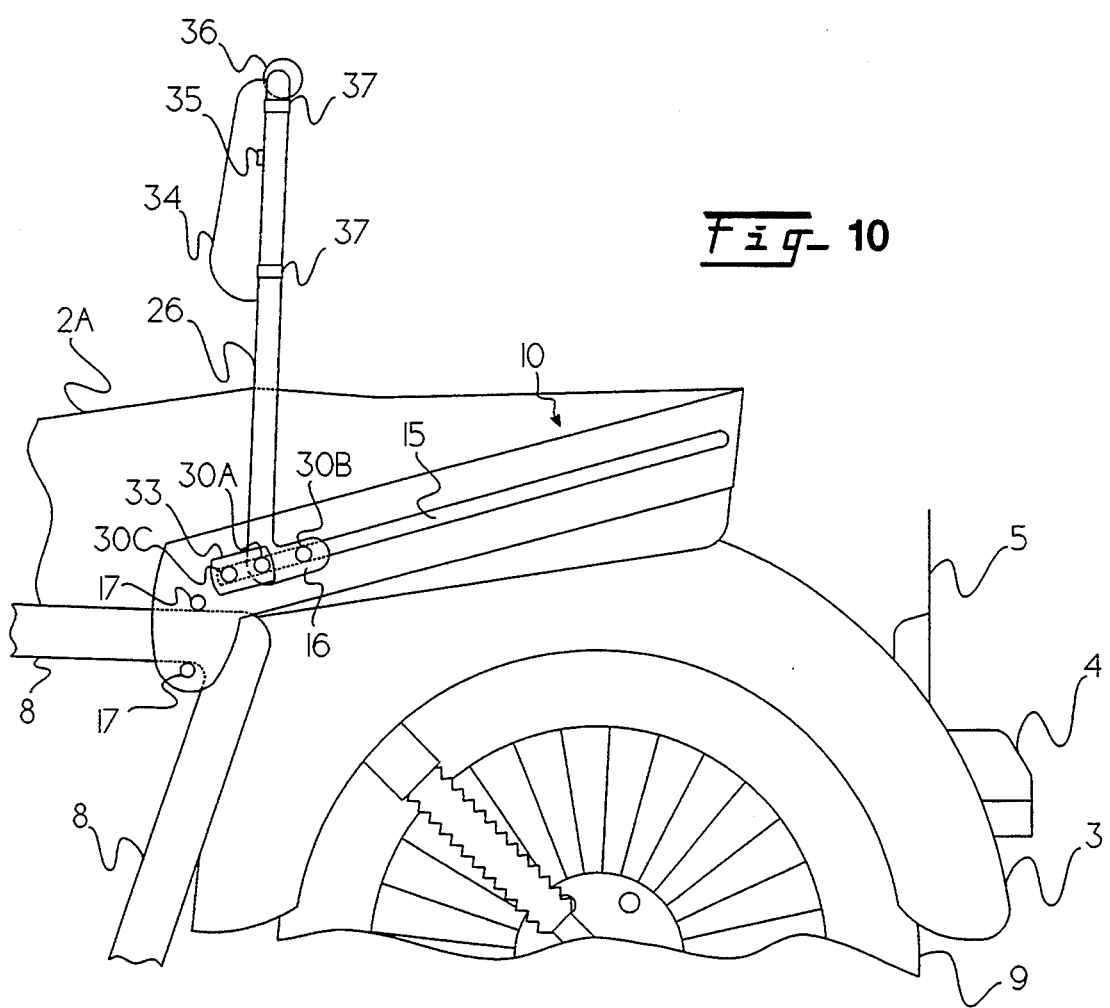
Figure 11:
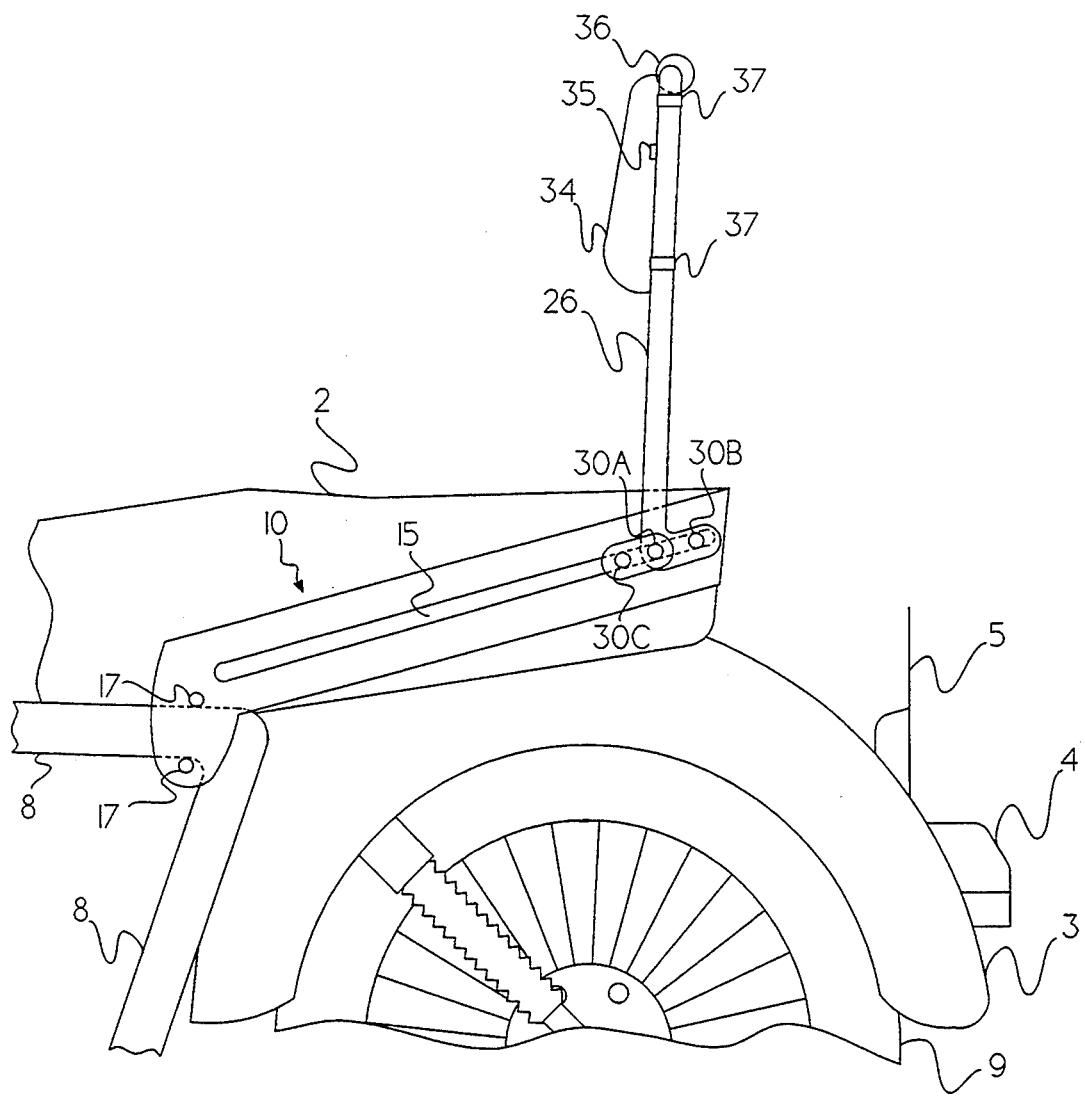
Figure 11A:
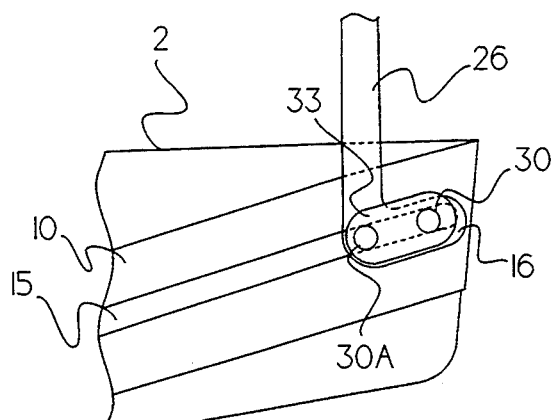
Figure 11B:
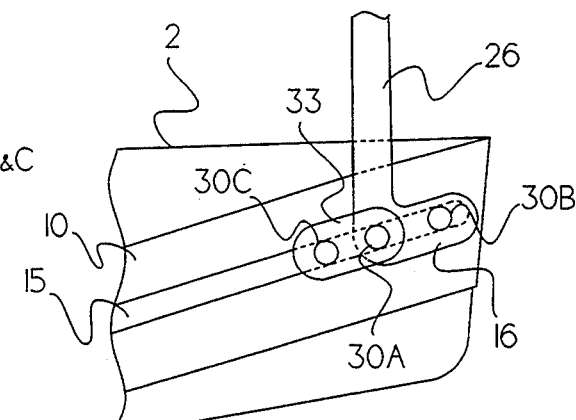

FIG. #1A' is a completed isolated view of a single main base or support plate.

FIG. #1B' is a cross-sectional view of a single main base or support plate mounted on a motorcycle fender.

FIG. #1C is a left side of a single main base or support plate in place on the rear motorcycle fender.

FIG. #2 is a left side view of the main base support plate attached to the rear frame of the motorcycle.

FIG. #3 is a right side view of the main base support plate attached to the rear frame of the motorcycle.

FIG. #2A is an enlarged view of the main base support plate attached to the posterior frame of the motorcycle as shown in FIGS. #2 and 3.

FIG. #3A is a cross-sectional view of the main base support plate attached to the posterior frame of the motorcycle as shown in FIGS. #2 and 3.

FIG. #4 is a posterior view of the main base support plate attached to the rear of the motorcycle.

FIG. #5 is a complete isolated view of the sliding support bar with the mobile security free-steel plates at the 2 ends.

FIG. #6 is a view from above of the sliding support bar attached to the main base support plate.

FIG. #6A is an anterior view of the cushion pad supported by mobile metallic rings over the transverse bar and kept in position by loop fasteners (Velcro) at the corners.

FIG. #6B is the same as FIG. #6A but a posterior view to show the transverse steel support bar of the cushion pad.

FIG. #7 is an upright posterior view of a motorcycle and the sliding support bar with the corresponding cushion pad and supports in place showing the areas where to apply the reflector security tape.

FIG. #7A is an upright anterior view of the sliding support bar with the cushion pad in place.

FIG. #8 is a left side view of the sliding support bar in the resting position at the rear of the motorcycle.

FIG. #9 is a left side view of the sliding support bar with the cushion pad used in the luggage rack position.

FIG. #10 is a left side view of the sliding support bar in the upright anterior position at the front of the sliding track of the main base support plate to be used in the back support position for the driver.

FIG. #11 is a left side view with the sliding support bar in the upright posterior position at the rear of the sliding track of the main base support plate to be used in the back support for the passenger.

FIG. #11A is an enlarged view of the connection of the sliding support bar to the main base or support plate showing the free mobile steel plate in the resting position.

FIG. #11B is an enlarged view of the connection of the sliding support bar to the main base support plate showing the free mobile steel plate in the security position.

DESCRIPTION OF THE PREPARED EMBODIMENTS

Referring now to the figures of the drawings in detail and initially to FIG. #1A which corresponds to the rear supporting structure of a motorcycle 1 with the components as the rear wheel 9, posterior frame 8, driver seat 2A and passenger seat 2. The sliding support bar 26 is shown held upright in the vertical position for supporting a passenger with the horizontal of the seat. The same sliding support bar 26, shown by phantom lines 26', can be moved by sliding it anteriorly in the vertical position for supporting a rider with the horizontal of the seat.

FIG. #1 shows the main base or support plate 10 which consists of a single piece of steel plate of $\frac{1}{4}$ inch in thickness by 2 inches wide. This one has a right arm 12 and left arm 11 and, at the center of the main support plate 10, it becomes a wider area 13 to accommodate to the rear of the back seat and secured to the bike by a single screw at the opening 14 on the lower corner of this wider area 13 enlargement of the main base 10. In the middle area of the right arm 12 and the left arm 11, there is an open track 15 which runs from the anterior to the posterior of the main base support 10 at the 2 arms and is $\frac{1}{4}$ inch wide to accommodate the screws which allows the sliding support bar 26 to slide back and forth over the main base support plate 10. On the two ends of this main base support plate 10 there is a 3 inch enlargement called the left front support head 16 and a right front support head 16A which has 2 openings 17–17A) (respectively) in order to allow for a U-bolt clamp 22 (FIG. #3A) to pass through it which will hold it to the posterior frame 8 of the motorcycle. This is the easiest way to put this together and to attach the first part or the main base support plate 10 to the motorcycle. However, if the construction of the motorcycle does not allow adaptability of this plate, it will be required to use 2 separate arms bases 10 and 10A as FIG. #1A shows as another means to use the main base or support plate 10A with the anterior 19 and posterior 20 perforations and the opening track 15 in place.

FIG. #1B shows a cross-sectional view of the way the right or left main base support plate 10A is attached to the motorcycle 1 rear fender 21 of the motorcycle by using two single screws with the bolts 19A in the anterior and another 2 screws at the posterior area 20A. In order to have this attachment performed, the rear fender 21 requires to have 4 perforations done, 2 anterior 19A and 2 posterior 20A.

FIG. #1C shows the left single main base or support plate 10A in place on the rear fender 3 of the motorcycle attached by 2 screws at the anterior 19 and 2 screws at the posterior 20 plus also showing the sliding track 15.

FIGS. #2 and 3 show a left and right view of the main base support plate 10 attached to the rear frame 8 of the motorcycle which is well described in the next section.

FIGS. #2A and 3A here shows an enlarged 2A and a cross-sectional 3A view of this attachment of the base main support plate 10 to the posterior frame 8 of the motorcycle 1. On the front support head 16, which is a 3 inch steel enlargement, there are 2 openings 17 localized at the upper and lower area to receive U-bolt 22. The upper and lower arms of a U-bolt clamp 22 will be passed around and secured to the upper rear of the motorcycle frame 8. They will be tightened up by screwing the corresponding nuts 23 of the U-bolt clamps 22 on the right and left sides of the motorcycle. Screw caps 24 will be added for protection.

FIG. #4 shows a posterior view enlargement of the main base support plate 10. In order to accommodate it to the rear of the back seat 2 and to attach it to the motorcycle seat 2 a single screw must pass through the opening 14. That exposed area can very well also be used for reflector tape 25 to provide easy visibility as a security precaution. This fig. also shows the rear light 4.

FIG. #5 shows an isolated view of the sliding support bar 26 which consists of a single steel bar of ¼ inch thick by 1 inch wide. This one has 3 arms; a right 28, transverse 25, and left 27 (it also can be a single circular rod of ½ inch diam.) with two enlarged ends called the front support heads left 16 and right 16A. Present on either one are 2 openings 230A and 30B to receive support screws which will glide on the sliding open track 15 of the main base or support plate 10. Also, there will be attached to the main screw 30A, a security mobile free plate 33 (see FIG. #11B also) of 2 inches by 1 inch which, by itself, has a perforation 30C to receive a screw so as to be tightened up over the open track 15 in order to provide more security for the back support. The transverse arm 29 can also have reflector tape applied for security purposes.

FIG. #6 shows the sliding support bar 26 with the left 27, right 28, and transverse 29 arms in the horizontal and parallel positions in relationship to the main base or support plate 10 and the passenger seat 2. Being held from the sliding support bar 26 and mostly from the transverse arm 29 is a cushion pad 34 that should be soft enough to provide a comfortable back rest for the rider or passenger but firm enough to carry a load when it is used as a luggage rack. The cushion pad 34 is held by 4 or 5 mobile metallic rings 36 which go around the transverse bar 29 and the upper part of the cushion pad 34 and secured by 4 loop fasteners (Velcro) 37 by localizing 2 on the upper angle of the transverse arm 29 and the left 27 and right 28 arm junctions and 2 on the lower area between the cushion pad 34 and the left 27 and right 28 arms. Also, the cushion pad 34 will be supported in the mid-section by a steel transverse bar 35.

FIG. #6A shows an anterior view of the cushion pad 34 in the upright position supported by rings 36 which go around the transverse bar 27 with the loop fasteners (Velcro) 37 as indicated above.

FIG. #6B shows a posterior view of the cushion pad 34 in the upright position depicting the posterior steel transverse bar support 35 and the rings 36 with the loop fasteners (Velcro) 37 as enumerated above.

FIG. #7 shows a posterior view of the sliding support bar with its components of the left arm 27, right arm 28, and transverse arm 29 in the vertical position for supporting a rider or passenger with the horizontal of the seat 2 of the motorcycle 1. The cushion pad 34 occupies the upper space of the area created between the left arm 27 and the right arm 28 and just below the transverse arm 29. The cushion pad 34 may be made of rubber or any suitable cushioning material and will measure around 8 inches vertically by 7½ inches horizontally which will leave a small space no more than a ¼ inch margin between the cushion pad 34 and the left 27 and right 28 arms to facilitate a pendulum swinging motion of the cushion pad 34 around the transverse bar provided by the several metallic rings 36 which are holding the upper part of the pad 34. At each corner of the cushion pad 34 there are attached loop fasteners (Velcro) 37 and 37'. On the lower cushion pad 34, the loop fasteners 37 go around the left arm 27 and right arm 28 of the sliding support bar 26. At the upper corners of the cushion pad 34, the loop fasteners (Velcro) 37' also go around the transverse bar 29 at the junction with the left arm 27 and right arm 28. These loop fasteners give stability to the cushion pad 34. The cushion pad 34, in order to provide a good steady support at the rear, will have a transverse steel bar 35 soldered to the left arm 27 and the right arm 28 at a distance of around 4 inches from the transverse arm 29 and in that way, the center of the cushion pad 34 will be resting over this support bar 35. The rear area of this cushion pad 34 may be utilized by attaching reflector security tape 25 to give full visibility of the motorcycle 1. The same reflector security tape 25 may be used on the posterior metallic area 13 of the main base support plate 10 to increase that security.

FIG. #7A shows an anterior view of the previous description completed on FIG. #7.

FIG. #8 shows a left view of the invention when it is not in use for any purpose. This one can also be dismantled (taken off) very easily by taking off the attachment of the main base support plate 10 from the rear frame of the motorcycle 8 on the right and left sides of the motorcycle which are being kept together (see FIGS. #2A and #3A) with the U-bolt clamps going through perforations 17 of the front support head 16 and by performing the reverse procedure as described there. Also, to complete the dismantling of the main base support plate 10, it will require to follow the steps of FIG. #4 but in the reverse faction as described there.

If keeping the main base support plate 10 on the motorcycle 1 the sliding support bar 26 will be held parallel to the open track 15 of the main base support plate 10 by keeping only the screw 30a at the perforation, so called the Master screw, tightened loosely and in this way, the end of the sliding support bar 26 with the cushion pad 34 attachment and with the actions of the metallic rings 36, the cushion pad 34 will be dropped to the rear fender 3 at the back of the license plate support 5 by a pendular motion of 270 degrees and will be kept in this position using a magnet 38 attached to the base of the license plate support 5.

FIG. #9 shows as previously described in FIG. #8 the use of the cushion pad 34 as a luggage rack by using the counterclockwise pendular motion in the reverse of the 270 degree turn. The lower end of the cushion pad 34 will be resting on the rear of the passenger seat 2. This one can be accomplished by loosening the Master screw 30a on the perforation over the open track 15 of the main base support plate 10 and moving the sliding support bar 26 slightly forward so that the cushion pad 34 is in a good supported position at the end of the passenger seat 2. The Master screw 30a will be tightened up over the open track 15 of the main base support plate 10 in order to keep that position securely in place.

FIG. #10 shows a left side view of the sliding support bar 26 in the vertical anterior position in relationship to the horizontal rider seat 2A and is kept in this position by being attached to the main base support plate 10 by the Master screw 30a and supported by a screw 30b holding the left support head 16 in place. This one is reinforced by attaching a single-free mobile left steel plate 33 measuring 3 inches in length by 1½ inch wide. This one has two openings; one posterior which matches the opening for the Master screw 30a which holds the sliding support bar 26 in place and the free mobile plate 33 is attached to the main base support plate 10 by inserting that screw 30b and tightening it up on the sliding track 15. The anterior hole 30c of this free plate 33 will be held by another screw to provide the attachment to the main base support plate 10 on the sliding track 15. This will give more security and stability to the sliding support bar 26 and then in this case will provide the support needed to the rider.

FIG. #11 shows a left side view of the sliding support bar 26 in the vertical posterior position in relationship to the horizontal passenger seat 2; keeping the posterior position at the main base support plate 10 by using the same steps as described in FIG. #10 and very clearly shown in FIGS. #11A and #11B.

FIG. #11A shows the left side support head 16 attached to the main base or support plate 10 by using the most posterior area of the sliding track 15 and by tightening up the posterior screw 30b which also passes through the perforation 30c localized on the single free mobile steel plate 33. This one will rotate as clock hands over 360 degrees around the Master screw 30a always holding the free mobile plate 33 with its function as to give security to the riders.

FIG. #11B. This mobile free plate 33 will be rotated to 180 degrees from the previous position and when the anterior perforation 30c matches the sliding track 15, a screw will be passed through it and tightened up. In this way there will be more stability and security for the back seat which is represented by the cushion pad 34 and is supported by the transverse steel bar 35 and the loop fasteners (Velcro) 37 at the 4 angles of it. This maneuver will be synchronized together with the opposite sides, right and left, for better results and, all the screws in the perforations 30a,b, and c will be tightened up in order to give better support for the passenger's back.

I claim that:

1. A back support for attachment to a motorcycle having a frame and a forwardly disposed driver's seat and a rearwardly disposed passenger's seat, said back support comprising first and second main components:

I. said first main component being a main base support plate and comprising:

a. a first single steel bar with an enlargement at a center thereof attached to a rear of said seats, and being bent at two 90 degree angles to create a U-shaped configuration including said center enlargement and right and left legs, each leg having an end;
  b. an enlarged front support head at the ends of each of said two legs, wherein said front support heads are adapted for mounting on the frame of the motorcycle using a U-bolt clamp; and
  c. a longitudinal open tract in a middle area of each of said legs extending from the support head to the enlargement at the center;

II. said second main component being a sliding support bar comprising:

a. a second single steel bar that has been bent at two ends in 90 degree angles thereby forming a U-shaped configuration comprising a straight transverse arm of several inches in the center of said second single steel bar and right and left arms each having a free end;
  b. at said free ends of each said right and left arms there is another 90 degree bend forming a support head of the sliding support bar wherein each support head has two perforations which are 1 inch apart;
  c. two screws disposed in said perforations in each support head which, when loosened, are slidable in the longitudinal open track of the main base support plate and which hold the sliding support bar in a selected position along the track upon tightening of the screws;
  d. said support heads each having a free mobile steel plate pivotally attached thereto; said free mobile steel plates each having two perforations; one of said two perforations being attached at all times to one of said two screws such that said mobile steel plate will rotate around this screw in a clockwise motion which will enable locking of the second perforation with the other of the two screws on the sliding track to provide more stability to said sliding support bar;
  e. a plurality of metallic rings attaching a cushion pad to said straight transverse arm, wherein said cushion pad is supported at each corner by hook and loop fasteners; and
  f. a transverse bar which is soldered at a mid-section of said right and left arms approximately 4 inches from and substantially parallel to said straight transverse arm.

2. The back support of claim 1 wherein the sliding support bar is pivotable about the support heads from a vertical to a horizontal position wherein in the horizontal position the cushion pad is in a resting position in front of a license plate and a magnet holds the cushion pad in the resting position.

3. The back support of claim 2 wherein from said resting position, said cushion pad is pivotable 270 degrees about said metallic rings until said cushion pad is supported on an end of the passenger seat in a substantially horizontal position for use as a luggage rack.

4. The back support of claim 1 wherein said sliding support bar is vertically disposed, slidable to a forward-most position in the open track, and held in the forward-most position by tightening the screws, thereby serving as a secure back rest for said driver's seat.

5. The back support of claim 1 wherein said sliding support bar is vertically disposed, slidable to a rear-most position in the open track, and held in the rear-most position by tightening the screw, thereby serving as a secure backrest for said passenger's seat.

* * * * *